United States Patent
Liu et al.

(10) Patent No.: US 11,805,416 B2
(45) Date of Patent: Oct. 31, 2023

(54) SYSTEMS AND METHODS FOR MULTI-LINK DEVICE PRIVACY PROTECTION

(71) Applicant: Apple Inc., Cupertino, CA (US)

(72) Inventors: Yong Liu, Campbell, CA (US); Jinjing Jiang, San Jose, CA (US); Jarkko Lauri Sakari Kneckt, Los Gatos, CA (US); Tianyu Wu, Fremont, CA (US); Qi Wang, Sunnyvale, CA (US); Lochan Verma, Danville, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 17/370,914

(22) Filed: Jul. 8, 2021

(65) Prior Publication Data
US 2022/0060898 A1     Feb. 24, 2022

Related U.S. Application Data

(60) Provisional application No. 63/068,242, filed on Aug. 20, 2020.

(51) Int. Cl.
| | |
|---|---|
| *H04L 29/06* | (2006.01) |
| *H04W 12/069* | (2021.01) |
| *H04L 9/30* | (2006.01) |
| *H04W 12/02* | (2009.01) |
| *H04W 12/08* | (2021.01) |

(52) U.S. Cl.
CPC ............ *H04W 12/069* (2021.01); *H04L 9/30* (2013.01); *H04W 12/02* (2013.01); *H04W 12/08* (2013.01)

(58) Field of Classification Search
CPC ... H04W 12/069; H04W 12/02; H04W 12/08; H04L 9/30; H04B 7/02
USPC .......................................................... 713/153
See application file for complete search history.

(56) References Cited

U.S. PATENT DOCUMENTS

| | | | |
|---|---|---|---|
| 7,188,251 B1 * | 3/2007 | Slaughter | H04L 67/51 713/185 |
| 8,601,587 B1 * | 12/2013 | Powell | G06F 21/552 726/25 |
| 10,820,201 B1 * | 10/2020 | Thangaveluchamy | H04L 63/0892 |
| 2016/0135041 A1 * | 5/2016 | Lee | H04L 45/745 726/3 |
| 2016/0192186 A1 | 6/2016 | Lin | |
| 2018/0218168 A1 * | 8/2018 | Goel | G06F 16/22 |
| 2019/0335454 A1 | 10/2019 | Huang et al. | |
| 2021/0014776 A1 * | 1/2021 | Patil | H04W 48/08 |

* cited by examiner

*Primary Examiner* — Jeffrey C Pwu
*Assistant Examiner* — Samuel Ambaye
(74) *Attorney, Agent, or Firm* — Fish & Richardson P.C.

(57) ABSTRACT

A method for communicating over a wireless network includes broadcasting, by a Multi-Link Device (MLD) device, service data indicative of one or more services for wireless communication with a client device; wherein the service data indicates that a service type is differentiated based on a type of the client device; establishing a security association with the client device; and in response to establishing a security association with the client device, granting access by the client device to a subset of the one or more services based on the type of the client device.

18 Claims, 9 Drawing Sheets

```
┌─────────────────────────────────────────────────────────┐
│ Broadcasting, by a multi-link listener discovery (MLD) device, service │
│ data indicative of one or more services for wireless communication │
│                     with a client device              602 │
└─────────────────────────────────────────────────────────┘
                              │
                              ▼
┌─────────────────────────────────────────────────────────┐
│     Establishing a security association with the client device │
│                                                     604 │
└─────────────────────────────────────────────────────────┘
                              │
                              ▼
┌─────────────────────────────────────────────────────────┐
│ In response to establishing a security association with the client │
│ device, granting access by the client device to a subset of the one or │
│     more services based on the type of the client device    606 │
└─────────────────────────────────────────────────────────┘
```

Receiving, by a multi-link listener discovery (MLD) device, a request from a client device to establish a secure association with the MLD device, the request comprising multi-link media access control (ML-MAC) address data indicative of a ML-MAC address and over the air MAC (OTA-MAC) address data indicative of a OTA-MAC address
702

Establishing a secure association between the MLD device and the client device
704

In response to establishing the secure association, receiving, from the client device, an indication of a changed ML-MAC address or a changed OTA-MAC address for communication with the client device
706

SYSTEMS AND METHODS FOR MULTI-LINK DEVICE PRIVACY PROTECTION

CROSS-REFERENCE TO RELATED APPLICATION

This application claims priority to U.S. Provisional Patent Application No. 63/068,242, filed Aug. 20, 2020, the entire contents of which are incorporated herein by reference.

TECHNICAL FIELD

This document relates to wireless communication systems. More specifically, this document relates to WiFi networks.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

In wireless communications networks, a device capable of support wireless transmission and receiving can be configured to support a single service set identifier (SSID) network or a multi-SSID network. Each SSID can be associated with an access point (AP) that configures communications links to other devices that are using the wireless network. A multi-SSID network can have more than one SSID, each corresponding to a virtual access point. An AP device can also be configured as a Multi-Link Device (MLD). As an MLD, the AP device is discoverable by other devices on multiple links, with each link corresponding to a different operating band and channel. The other devices (such as network devices or endpoint devices) are configured to discover the access point and send data to the access point to configure a communication link with the access point.

SUMMARY

The systems and methods described in this document is configured for protecting privacy for Multi-Link Device (MLD) in wireless communications networks. Generally, the wireless communications networks can be WiFi networks based on the IEEE 80.2.11be family of standards. A networking system is configured to enable multi-link devices that provide different access points (APs) on different links to support different client devices. A client device can include any computing device that is attempting to establish one or multiple links with the networking system. The networking system generally includes a networking device configured to establish wireless communications links with respective client devices to form a wireless communications network.

The implementations described herein can provide various technical benefits. For instance, the techniques described herein enable the networking system to provide differentiated services to different types of clients. The networking system is configured to hide an existence of a particular AP (such as for a premium service) from clients that do not qualify to establish a connection with the particular AP. This can prevent non-premium client devices from discovering the existence of a premium service. In another example, this prevents client devices from discovering APs with which they do not have permission to establish a communication link. This can improve security for these APs. In another example, the networking system is configured to hide a correlation between a particular AP and respective client device. Generally, the networking system is configured to hide a correlation between premium client station addresses and particular access points that are exclusive. Hiding the correlation between client STAs and particular addresses of particular multi-link APs reduces or eliminates the ability for non-premium clients to determine what the addresses are for either premium clients or for premium ML APs, which can increase security for these APs and for the premium clients.

In an aspect, a process for privacy protection for MLD devices is described. The process includes, by a MLD device, broadcasting service data indicative of one or more services for wireless communication with a client device. The service data indicates that a service type is differentiated based on a type of the client device. The MLD device establishes a security association with the client device. The MLD device, in response to establishing a security association with the client device, grants access by the client device to a subset of the one or more services based on the type of the client device.

In some implementations, the type of client device indicates one or more network resources available to the client device. The one or more network resources can include an access point, a subnetwork, or both. In some implementations, one or more services each comprises an access point for establishing a communication link between the client device and a networking device. In some implementations, each access point is associated with a radio band comprising one of a 2.4 GHz radio band, a 5 GHz radio band, or a 6 GHz radio band. In some implementations, the type of client device is indicated by a private pre-shared key (PPSK) or a simultaneous authentication of equals (SAE) password identifier.

In some implementations, the process includes determining, by the MLD device, that the client device is requesting access to a service that the client device is not authorized to access; and in response to determining, rejecting the request and providing an authorized service to the client device instead of the requested service.

In an aspect, a process for privacy protection for MLD devices is described. The process includes, receiving, by a multi-link listener discovery (MLD) device, a request from a client device to establish a secure association with the MLD device. The request includes multi-link media access control (ML-MAC) address data indicative of a ML-MAC address and over the air MAC (OTA-MAC) address data indicative of an OTA-MAC address. The process includes establishing a secure association between the MLD device and the client device. The process includes, in response to establishing the secure association, receiving, from the client device, an indication of a changed ML-MAC address or a changed OTA-MAC address for communication with the client device.

In some implementations, the process includes receiving, from the client device, encrypted data indicative of one or more station (STA) OTA addresses. The process can include, in response to establishing the secure association, receiving, from the client device, an indication of a changed STA-OTA for communication with the client device.

In some implementations, the indication of the changed ML-MAC address or the changed OTA-MAC address for communication with the client device is a portion of an encrypted management frame or an encrypted action frame of a communication packet. In some implementations, the MLD comprises a plurality of access points, at least one access point of the plurality being a premium access point and at least one access point of the plurality being a non-premium access point. The process can further include establishing the secure association between the MLD device and the client device using the non-premium access point. The process can include updating the secure association to be between the MLD device and the client device using the premium access point based on the changed ML-MAC address or the changed OTA-MAC address.

A process for privacy protection for MLD devices is described. The process can include broadcasting, by a multi-link listener discovery (MLD) device, service data indicative of one or more services for wireless communication with a client device. The service data indicates a first available service type for a communication link with the MLD device. The process includes establishing a security association with the client device. The process includes receiving authentication data from the client device, the authentication data indicative of a second service type available from the MLD device that is different from the first available service type. The process includes, in response to receiving the authentication data from the client device, switching the communication link from the first service type to the second service type.

In some implementations, the second service type includes a higher bandwidth than the first service type. In some implementations, the second service type comprises a communication using a 6 gigahertz (GHz) radio band. In some implementations, the second service type represents a subnetwork with additional administrative privileges relative to the first service type.

In some implementations, the process includes receiving, by the MLD device, a request for communication using the second service type by the client device prior to establishing the security association with the client device. The process includes rejecting the request without providing an indication that the second service type is available.

In some implementations, the security association enables a unicast communication between the MLD device and the client device.

In some implementations, the process includes providing, by the MLD device, off-link change data to the client device using a secure unicast management data frame.

In some implementations, the process includes broadcasting, by the MLD device, general MLD update data indicating a potential change to a basic service set identifier (BSSID) metric on any established communication link with the MLD device.

In some implementations, the process includes providing an identifier privacy public key to the client device in response to establishing the secure association. The process includes causing the client device to encrypt the ML-MAC address of the MLD device with the identifier privacy public key. The process includes causing a subsequent communication link to include a privacy session key based on the identifier privacy public key and a client identifier privacy public key.

In some implementations, the process includes receiving, from the client device, an update to a per-link over the air MAC (OTA-MAC) address of the client device in an encrypted field of a data frame. In some implementations, the data frame comprises an A-MSDU subframe header, wherein a unicast bit in a source field of the A-MSDU subframe header is set to a predetermined value.

The details of one or more embodiments are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
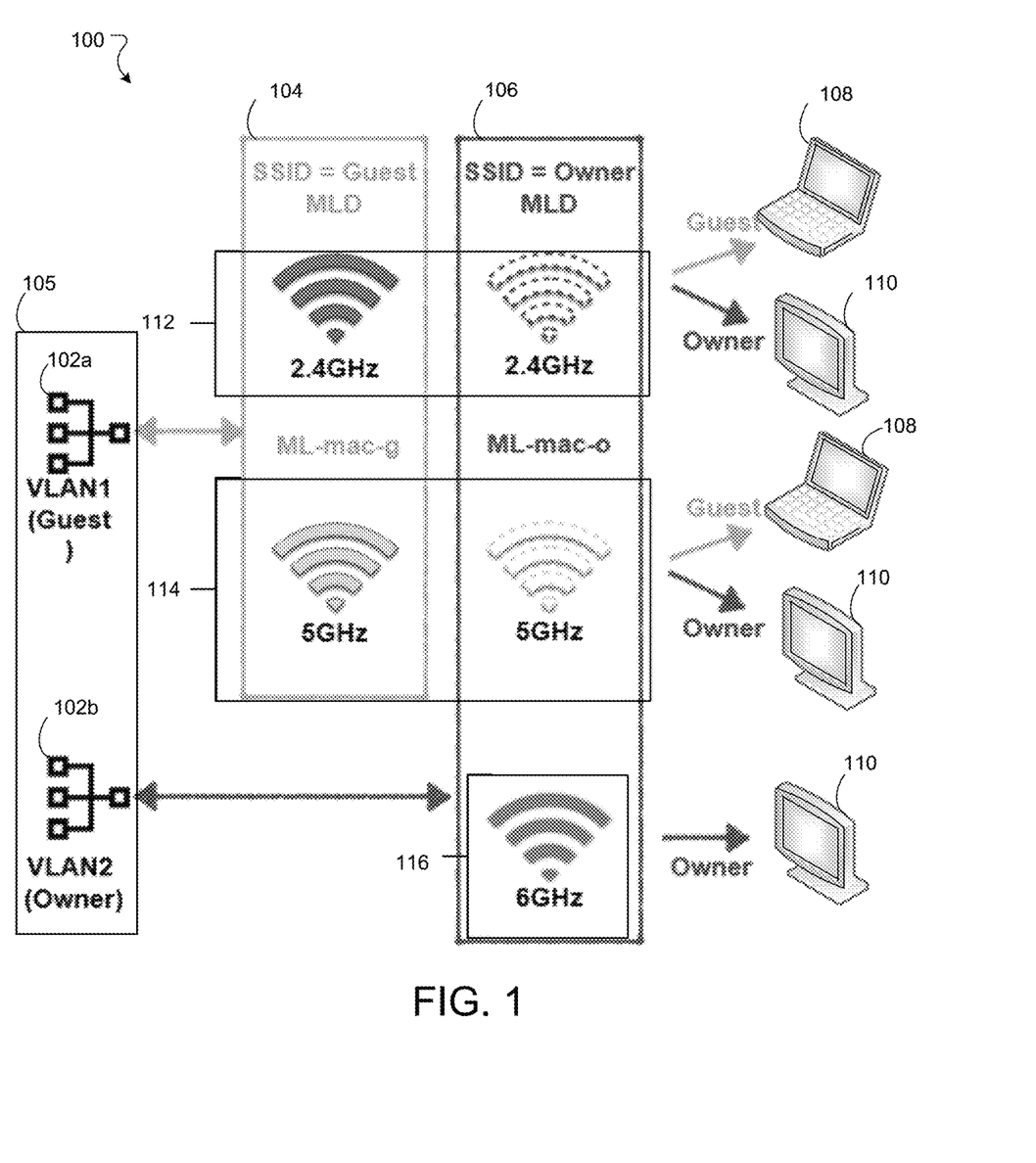
FIG. 1 is a block diagram of an example computing environment for a wireless network.

FIG. 1 shows an example of a wireless network 100. The wireless network 100 includes a networking device 105. The networking device 105 configures wireless networks 102a and 102b for wireless communication among client devices 108, 110 (subsequently described in further detail). The wireless network 100 includes a first network multi-link access point (AP) 104 and a second multi-link access point 106. Each of the first AP 104 and the second AP 106 can also be referred to by single service set identifiers (SSIDs) representing the network names. For example, each SSID corresponds to a virtual AP Multi-Link Device (MLD) devices. As subsequently described, each of the network SSIDs 104, 106 can have one or more communications links 112, 114, 116, each with different properties, such as bandwidth capabilities, access permissions, and so forth.

Generally, the networking device 105 can be configured to offer multiple access points in different ways. A first aspect to offering multiple access points is to offer multiple SSIDs, as shown by SSIDs 104, 106 in FIG. 1. Each of the SSIDs can be associated a subnet that is not connected to other subnets in the network 100. The effect of different subnets for different SSIDs is that devices that connect to a particular subnet using a particular SSID are restricted to that subnet and are not connected to other subnets. Additionally, each SSID can be associated with different access credentials, such as different passwords. For example, a first SSID can include an access point accessible only by administrator devices that are associated with the network 100, and a second SSID can be accessible by any client device.

In a second aspect, a single SSID is available to connect to various subnets. Each subnet may require a unique credential (e.g., a password) to access that subnet. For example, different credentials can include private pre-shared keys (PPSKs), simultaneous authentication of equals (SAE) password identifiers, and so forth. Different devices use the same access point to access different subnets. The single SSID network can be configured to hide subnetwork details from unauthorized devices. For example, a credential received from a client device requesting network access may indicate to the networking device 105 which subnet(s) that device is authorized to access. In response to the request, only the subnet(s) that are authorized for use by the client device (based on the credential) are shown to the device for connection. Other subnets are hidden from the client device.

The networking device 105 configures the SSIDs of multi-link access points 104, 106 to enable several privacy features when client devices 108, 110 request access to the network 100. Rather than broadcast all available SSID 104, 106 to each client device 108, 110 attempting to access the network, the networking device 105 is configured to prevent unauthorized client devices from receiving data about SSIDs that those client devices are not authorized to access. For example, if client device 108 is only authorized to access SSID 104, the networking device 105 is configured to show only SSID 104 as an option for accessing the network 100 by the client device 108. The networking device 105 is configured to avoid leaking privacy data to client devices that are unauthorized to receive the privacy data. For example, the networking device 105 is configured to prevent leakage of data indicating a number of subnetworks 102*a-b* in the network 100, which may provide indirect evidence of sensitive networks that are a target for unauthorized users.

In this specification, an unauthorized device includes a computing device that is not intended to receive sensitive data that is available to predetermined devices. The predetermined devices that are allowed to receive the sensitive data are authorized devices. Generally, the sensitive data includes data that reveals security or private information about a computing device, user, computing system, etc. The sensitive data generally includes data that can be used by a malicious user to perform an undesirable action on the network 100, such as accessing additional sensitive data, identifying a user, identifying restricted data, and so forth. An unauthorized device generally does not possess a required authentication to receive the particular data. However, an authorized device can also include a device that is not intended to receive certain data, even if that data are not encrypted or protected in any way. In other words, an unauthorized device can include a device that is accessing data that is either not intended for the unauthorized device or is preferentially kept private from the unauthorized device.

An authorized device includes a computing device that is intended to receive sensitive data from the network 100. For example, an authorized device can include a subscriber device, a device associated with a premium account, a device associated with valid credentials data, and so forth.

The networking device 105 is configured to protect data representing names of the subnetworks 102*a-b*, which may identify a network owner or reveal an intended authorized user and may provide a target for unauthorized users. For example, if a subnetwork is named "administrator network," or "owner network," such as subnetwork 102*b*, access to the network could be a target for non-administrator users, non-owner users, or other unauthorized users. These users may attempt to gain access to restricted data by accessing the private subnetwork 102*b*.

The networking device 105 is configured to protect data indicating capabilities of each of the subnetworks 102*a-b*. For example, a network provider that operates the networking device 105 may operate a generic service and a premium service. The generic service may allow access to access points 112, 114, which have 2.4 gigahertz (GHz) and 5 GHz radio bands, respectively. In an example, this may be offered as a free service to all guests of a hotel, such as guests associated with client devices 108 and 110. In an example, a premium service is available to preferred customers, such as guests staying in deluxe rooms at the hotel. The premium service may include an additional access point 116 offering a 6 GHz radio band wireless link. The hotel owner, who operates the networking device 105, may wish to keep the existence of the premium service private from most guests, and only show the existence of the premium service to guests in deluxe rooms. The networking device 105 is configured to keep the availability of the 6 GHz access point hidden from non-premium customers associated with devices (such as client device 108) and presented only to premium client device 110.

In another aspect, the networking device 105 is configured to protect data indicating a number of associations (e.g., connected devices) to a particular network. Generally, a client device may be able receive data indicating how many devices are connected to or associated with a particular subnetwork. In an example, this data can indicate to a client device that another device is associated with the subnetwork (or that a group of client devices are associated with that subnetwork). This data may implicitly reveal whether a subnetwork is exclusive, and therefore may make the subnetwork a target for unauthorized users who may presume that the subnetwork is a subnetwork that enables access to sensitive data (e.g., a sensitive subnetwork). The networking device 105 is configured to prevent client devices from receiving this data until the networking device confirms that those client devices are authorized to receive this data.

The networking device 105 is configured to improve upon a measure to deter unauthorized users, which involves hiding the access point's name by disabling the SSID broadcast. This approach can be ineffective as a security method because the SSID is broadcast in the clear in response to a client SSID query. As described in relation to FIGS. 2-5, the networking device 105 is configured to receive authentication prior to broadcasting the SSID to unauthorized devices.

Additionally, the networking device 105 is configured to improve upon a security method configured to allow computers with known media access control (MAC) addresses to join the network. Because eavesdroppers may be able to join the network by spoofing an authorized address, the networking device 105 is configured to hide associations between authorized addresses and secure networks. In an example, identity theft (or MAC spoofing) occurs when an unauthorized device is configured to intercept or analyze network traffic and identify the MAC address of a client device with network privileges (e.g., to AP 116). The networking device 105 includes MAC filtering to allow only authorized computers with specific MAC IDs to gain access and utilize particular networks (such as network 102*b*). However, client devices can be able to use network sniffing capabilities to view network traffic. Such client devices can spoof a MAC address for authorized devices to overcome this filter. Thus, it is beneficial for the networking device 105 to hide associations between the authorized client devices and the secure networks that the authorized client devices are authorized to access.

In some implementations, a client device can perform a network injection attack. In this example, the unauthorized client device uses access points that are exposed to non-filtered network traffic, specifically broadcasting network traffic such as "Spanning Tree" (802.1D), OSPF, RIP, and HSRP. The client device is configured to inject unauthorized networking re-configuration commands that affect routers, switches, and intelligent hubs, which can be portions of the networking device 105. A whole network can be brought down in this manner and require rebooting or even reprogramming of all intelligent networking devices.

A result of preventing unauthorized access of sensitive data on the network 100 is that client devices only receive data relating to the network 100 that is germane for that device to operate on the network. For example, a user interface for a Wi-Fi network card on a given client device shows only the networks intended to be available to the client device. This avoids cluttering the Wi-Fi user interface with locked subnetworks to which the user does not have access. Instead, once credentials are provided by the client device, the relevant subnetworks are revealed to the user and are presented on the associated user interface. The methods performed by the networking device 105 for keeping sensitive data private as previously discussed is subsequently described in detail in relation to FIGS. 2-5.

Generally, network 100 includes a Wi-Fi network. Wi-Fi uses multiple parts of the IEEE 802 protocol family. Client devices 108, 110 are configured to connect to the subnetworks 102a, 102b through wireless access points 112, 114, and 116 and to each other. Different versions of Wi-Fi are specified by various IEEE 802.11 protocol standards, with the different radio technologies determining radio bands, and the maximum ranges, and speeds that may be achieved. In FIG. 1, the 2.4 GHz (120 mm) UHF and 5 GHz (60 mm) SHF ISM radio bands are shown, in addition to a 6 GHz radio band. Generally, these bands are subdivided into multiple channels. Channels can be shared between networks 104, 106 but only one transmitter can locally transmit on a channel at any moment in time. Generally, the higher frequency communications links are able to transmit more data with less latency and less power consumption, depending on the particular frequency and transmission parameters for the link. For this reason, 6 GHz communications links may be reserved for exclusive use relative to the 2.4 GHz and 5 GHz communications links. The 6 GHz access point can be reserved for network owners or administrators, premium customers or users, and so forth. As previously described, in some implementations, a network owner or administrator may wish to keep the availability of the higher frequency access points (such as link 116 of access point 104) exclusive and also private from (e.g., hidden from) non-premium users.

In some implementations, a wireless access point (WAP) connects a group of wireless devices to an adjacent wired local area network (LAN). In this example, an access point resembles a network hub, relaying data between connected wireless devices in addition to a (usually) single connected wired device, most often an Ethernet hub or switch, allowing wireless devices to communicate with other wired devices.

As shown in FIG. 1, in some implementations, a multilink access point (ML-AP may advertise multiple SSIDs. In this example, network 100 includes a multi-link access point (ML-AP) broadcasts multiple SSIDs to client devices 108, 110. Here, each SSID corresponds to a virtual AP MLD. Generally, different virtual AP MLDs may associate to different virtual local area networks (VLANs). Different virtual AP MLDs (such as those represented by network 104 and network 106) may generally include different numbers of operating links and operating APs. For example, a home Wi-Fi network may have two subnets, including an owner subnet (e.g., network 102b) and a guest subnet (e.g., network 102a). In the example of FIG. 1, the home ML-AP includes a virtual AP MLD (e.g., network 106) for the owner subnet 102b, and a virtual AP MLD (e.g., network 104) for the guest subnet 102a. The guest AP MLD includes two APs, represented by links 112 and 114. The owner AP MLD includes three APs (with one premium AP represented by link 116 on the 6 GHz band). The home ML-AP (of network 100) may want to hide its subnet details and advertise the home network using a single SSID, rather than two SSIDs 104, 106. As previously described, this can be for privacy reasons.

Figure 2:
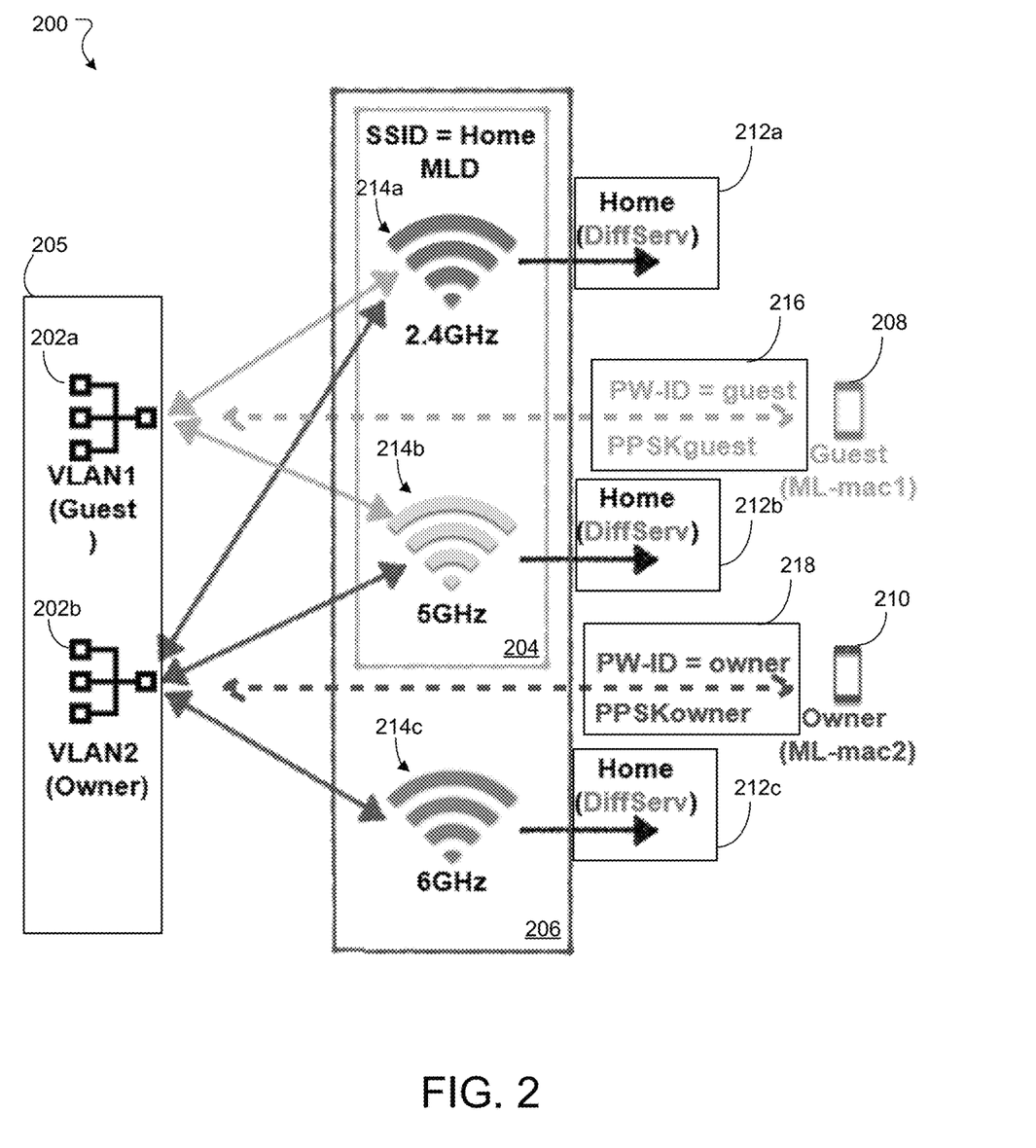
FIGS. 2-4 show illustrations of example wireless network configurations.

FIG. 2 shows a network 200 including a ML-AP network 206 configured to broadcast a single SSID and a single AP MLD (e.g., including no virtual MLDs) to hide its sub-net details. Networking device 205 includes two subnetworks 202a, 202b, similar to subnetworks 102a-b of FIG. 1. The subnetwork identifiers are hidden from client devices 208, 210. As stated previously, in some implementations, different types of clients can be assigned different password identifiers to enable the AP MLD to associate them to different subnets. The networking device 205 (which is similar to networking device 105) is configured to provide differentiated services through the AP MLD. For example, the networking device 205 is configured to provide different sets of operating links (including links 214a, 214b, and 214c) or different operating APs to different types of clients 208, 210. The networking device 205 is configured to enable a premium client (such as client device 210) to hide a premium service from other clients 208. The networking device 205 is configured to hide a correlation between the premium client 210 and the premium AP 214c.

To accomplish this, the networking device 205 configures the single-SSID AP MLD 206 to broadcast all its services (e.g. all operating APs or links 214a-c), in its beacons and probe response frames (unencrypted. The MLD 206 indicates that it is configured to provide differentiated services in packets 212a-c (e.g. a different set of APs) to different types of clients 208, 210. After a client 208, 210 establishes security association with the AP MLD 206 via one link 214a-c, the AP MLD 206 grants the client to access a subset of services (e.g. a subset of APs shown by set 204) based on the client type (e.g., for client 208). In some implementations, the security association can be performed using a password or similar authentication. Password 216 can authenticate a client device 208 to a first subset 204 of APs of the SSID, and password 218 can authenticate another client device 210 to a second, larger set of APs of the network MLD 206, such as all the available APs of the network. The AP MLD 206 verifies a type of the client (e.g. based on the client PW-ID or PPSK or cached PMK, shown in packets 216 and 218, respectively) during the client device's authentication and/or association with the MLD 206. In an example, if a client device 208 requests authentication and/or association via an AP (e.g., link 214c) that is unavailable to that client device, the AP MLD 206 is configured to reject the client device's 208 authentication and/or association request. The MLD 206 steers the client device 208 to an alternative AP (e.g., 214a-b), which the client device 208 is authorized to access. Alternatively, the MLD 206 accepts the authentication and/or association request, and after successful security association, steers the client device 208 to access the APs (e.g., 214a-b) being granted.

The single SSID MLD 206 is thus configured to show all services in the beacon, but the MLD indicates differentiated service at the same time as the client requests access. In this particular example, the MLD 206 is not configured to hide premium services to unauthorized users.

Figure 3:
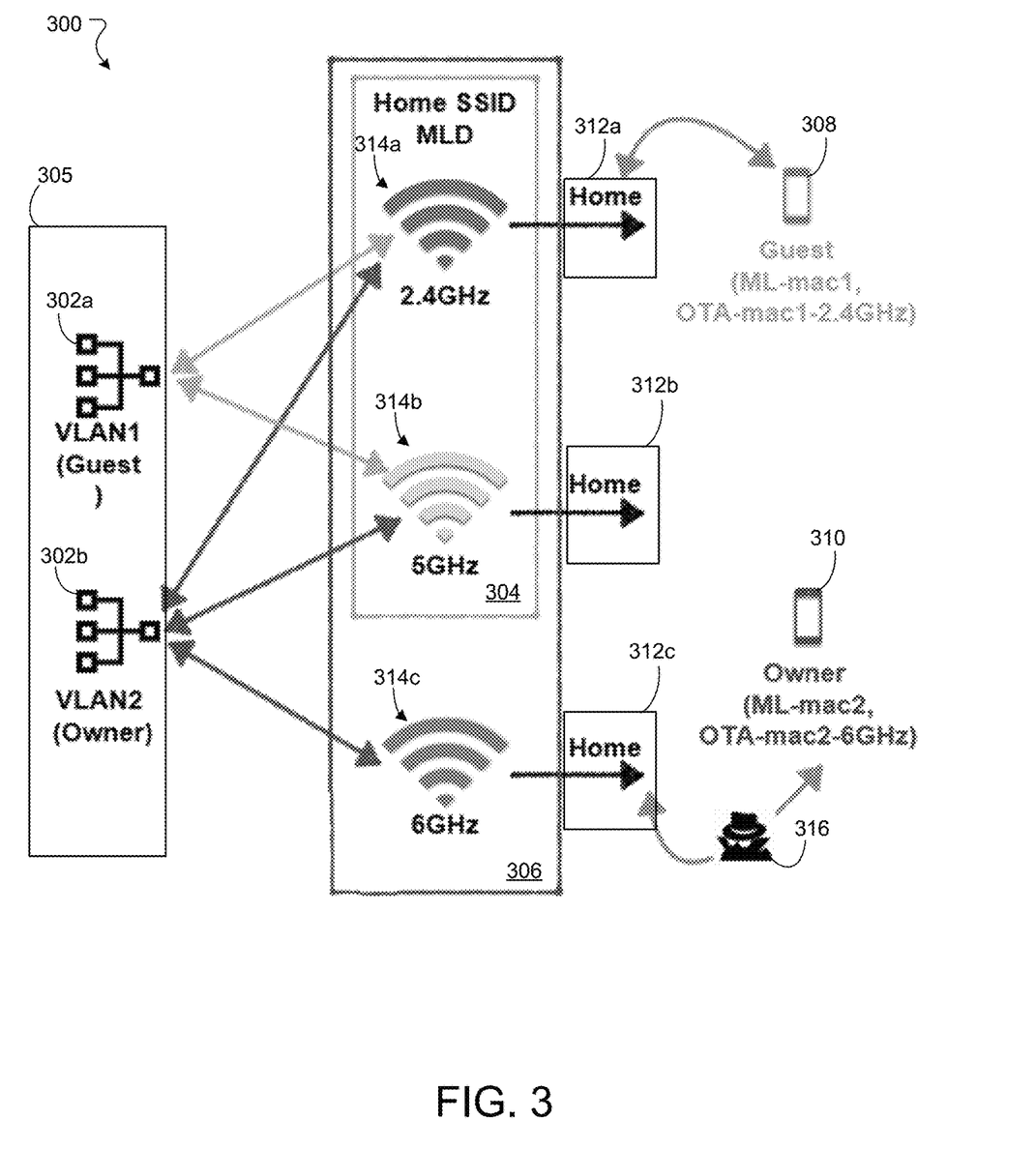

FIG. 3 shows a network 300 including a networking device 305 (similar to networking device 105 of FIG. 1). Network 300 includes an SSID MLD 306 including three APs over links 314a, 314b, and 314c. Subnetworks 302a and 302b are available to users with different authorizations. A subset of APs 304 represents a lower-access level for device 308 (e.g., a guest device). The client device 310 (e.g., an owner device) is authorized to access all AP links 314a-c of the MLD 306.

As shown in FIG. 3, each client device 308, 310 is associated with a ML-MAC address and per-link over the air (OTA) OTA-MAC address. Client device 308 has address ML-MAC1, and client device 310 has address ML-MAC2. Additionally, client device 308 has address OTA-mac1-2.4 GHz for accessing the VLAN1 guest network 302a over AP 314a via a 2.4 GHz link. Corresponding client device 310 has OTA address OTA-mac2-6 GHz for accessing the VLAN2 owner network 302b via a 6 GHz link.

Each client device 308, 310 is configured to provide its corresponding ML MAC address and OTA address in an unencrypted format to AP the MLD 306. The client device 308, 310 provides the ML-MAC and OTA-MAC addresses when requesting authentication and/or association to the AP MLD 206 on a link 314a-c.

The networking device 305 is configured to prevent, during the authentication and association handshakes 312a, 312b, and 312c, the client devices 308, 310 from exposing a correlation between the ML-MAC address and the OTA-MAC addresses on other links. The networking device 305 handshake processes (e.g., establishing a wireless connection between the MLD 306 and the client devices 308, 310) prevents exposure of the correlation among per-link OTA-MAC addresses received from the client devices 308, 310 to APs 314a-c. The client devices 308, 310 provides to AP MLD 306 the address hierarchy and correlations over a secured channel (e.g., an encrypted communication) after establishing security association with the AP MLD 306. For example, after security association via one link, the client sends an encrypted management/action frame to the AP MLD to add its other STAs (on other links) to the ML association, and provide the corresponding per-link OTA-MAC addresses.

In some implementations, the client devices 308, 310 are configured to change an OTA-MAC address of their respective association link (e.g., station or STA1 OTA/STA2 OTA . . . , etc.) immediately after the security association, in order to hide the correlation between its ML-MAC address and the OTA-MAC address of the association link (e.g., station or STA1 OTA/STA2 OTA . . . , etc.). In some implementations, a client device 308, 310 uses a same encrypted management/action frame to report other links address (e.g., STAs) OTA-MAC addresses as well as the new OTA-MAC address of the association link (e.g., STA). This process is described in further detail in relation to FIG. 5. In an example, a premium client device (e.g., client device 310) avoids associating to the AP MLD 306 via the premium AP (e.g., link 314c) to prevent exposing the correlation between its ML-MAC address and the premium AP to a third party 316.

In this way, the networking device 305 is configured to prevent unauthorized client devices 308 (e.g., non-premium client devices) from receiving data indicating that a premium service (e.g., AP 314c) exists. The client devices 308, 310 report their multi-link address and an OTA address (STA1, STA2, or STA3, etc.) to the AP, but hide alternative OTA addresses during the initial handshake process. The OTA address is then changed once a secure connection is established. In some implementations, the OTA address is not changed. In some implementations, the OTA is repeatedly changed. Thus, during the association of a link to a client device, the AP MLD receives each of the multi-link address and per-link (OTA) addresses. After the association, the OTA address can be repeated changed at different intervals to fool third party devices 316 trying to guess correlations between and among these addresses. For example, an attacker device 316 can be fooled when a premium client 310 associates with lower authentication network (e.g., APs of set 304). After the initial association, the device 310 switches to higher authentication premium network. The attacker device 316 never observes the association of the ML MAC of the client 310 with the premium address (e.g., for subnetwork 302b). The device 316 cannot know which client devices have premium access, and thus are discouraged from attacking particular client devices.

Figure 4:
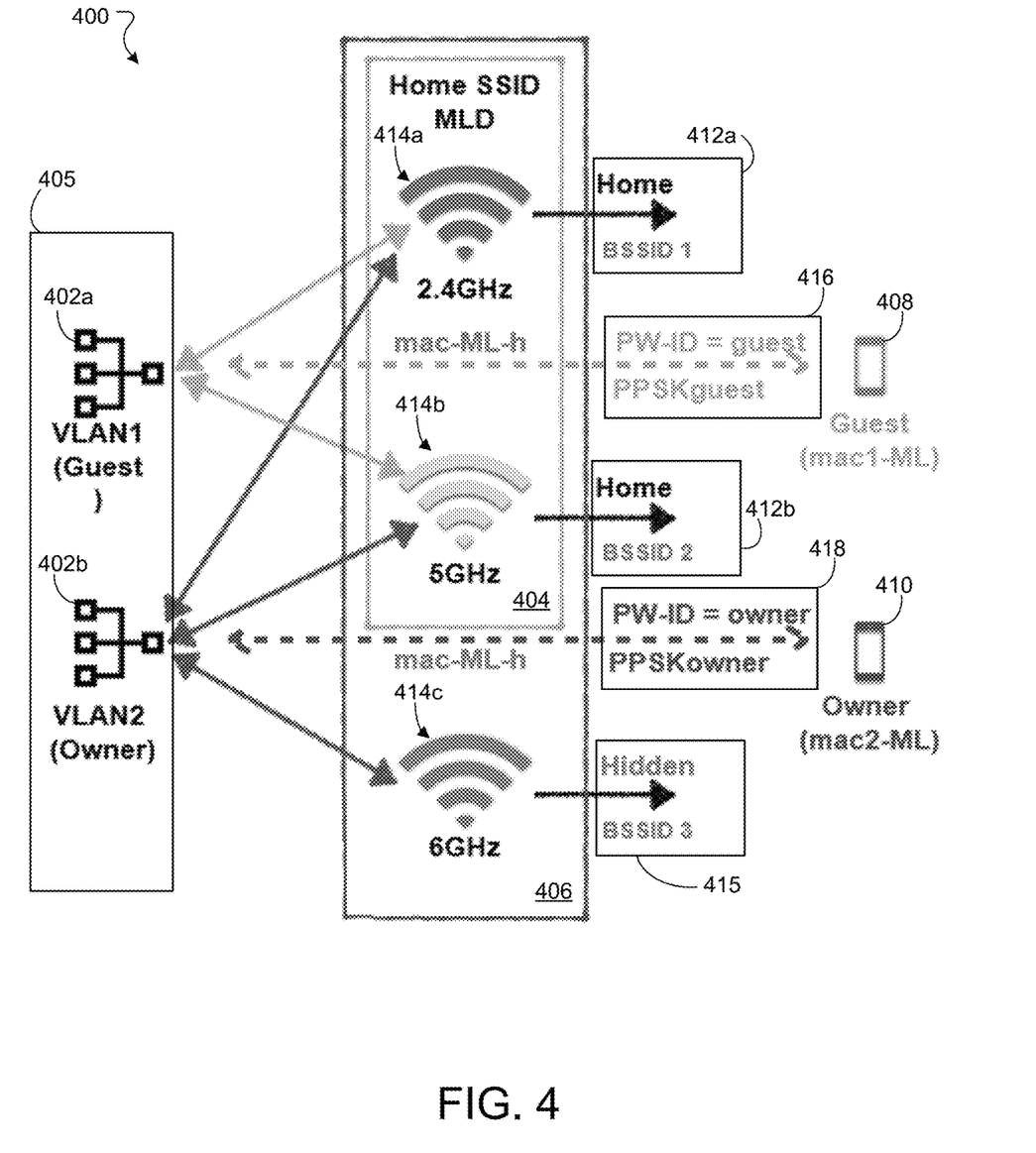

FIG. 4 shows a network 400 including a networking device 405 (similar to networking device 105 of FIG. 1). Network 400 includes an SSID MLD 406 including three APs over links 414a, 414b, and 414c. Subnetworks 402a and 402b are available to client devices 408, 410 with different authorizations. A subset of APs 404 represents a lower-access level for device 408 (e.g., a guest device). The client device 410 (e.g., an owner device) is authorized to access all AP links 414a-c of the MLD 406.

In network 400, the AP MLD 406 is configured to hide a "secret" premium AP 414c from client devices 408, 410 until particular authorization data is received from the client device (e.g., after association is completed on a less premium AP 414a, 414b). The premium AP link 414c of the AP MLD 406 may use a "hidden" SSID. For example, the SSID can be a zero-length SSID, a null SSID, and so forth. The AP MLD does not expose a correlation between the MLD 406 and the premium AP link 414c. The AP MLD 406 does not advertise the correlation between the premium AP 414c and itself in its beacon, probe response, association response, and other unencrypted management frames. The AP MLD 406 does not accept authentication and association at the premium AP 414c. This is because the MLD 406 would provide the ML-MAC address of the MLD and the premium APs basic service set identifier (BSSID), or the OTA-MAC address of the link 414c, to the client device 408, 410 requesting authentication and/or association. This would reveal the correlation between the premium AP 414c and the MLD 406 to a potentially unauthorized device 408.

To establish communication using the AP link 414c, the AP MLD 406 is configured to provide detailed address and capability information of the premium AP 414c to a premium client (e.g., client 410) using protected, unicast management frames over non-premium wireless links (e.g., APs 414a or 414b). Once the AP MLD 406 establishes the security association with the premium client (e.g., client 410), the availability of premium AP 414c is revealed to the client device 410 and a communication link can be established.

In some implementations, if the premium AP link 414c is configured to send BSS operation changes, the AP MLD 406 provides the off-link change indication to premium clients (e.g., client 410) using a protected unicast management frame, if the client device 410 connects at an alternative AP 414a-b, such as over links 412a-b. Alternatively, the AP MLD 406 provides a general MLD update indication, which informs all clients 408, 410 to check potential BSS changes on all granted APs 414a-c. This prevents any associations from being indicated between the MLD 406 and the premium AP 414c communication link 415.

As shown in FIG. 4, the premium client 410 is associated with an owner authentication PW-ID. The client device 410 is configured to verify over a secure connection with the MLD 406 that the client device 410 is entitled to communicate over the hidden AP 414c communication link 415. The client device 410 associates with the MLD 406 using one of the non-premium APs 404 available to all client devices, including non-premium guest client device 408. After associating with the MLD 406 using links 412*a-b*, the client device 410 password (e.g., PPSK-owner) is sent to the MLD 406 (which can be configured by the networking device 405). The hidden link 415 BSSID (e.g., BSSID 3) is then sent to the client device 410 to enable communication over link 415. Thus, client device 408 is only aware of BSSID 1 and BSSID 2 of links 412*a-b*.

Figure 5:
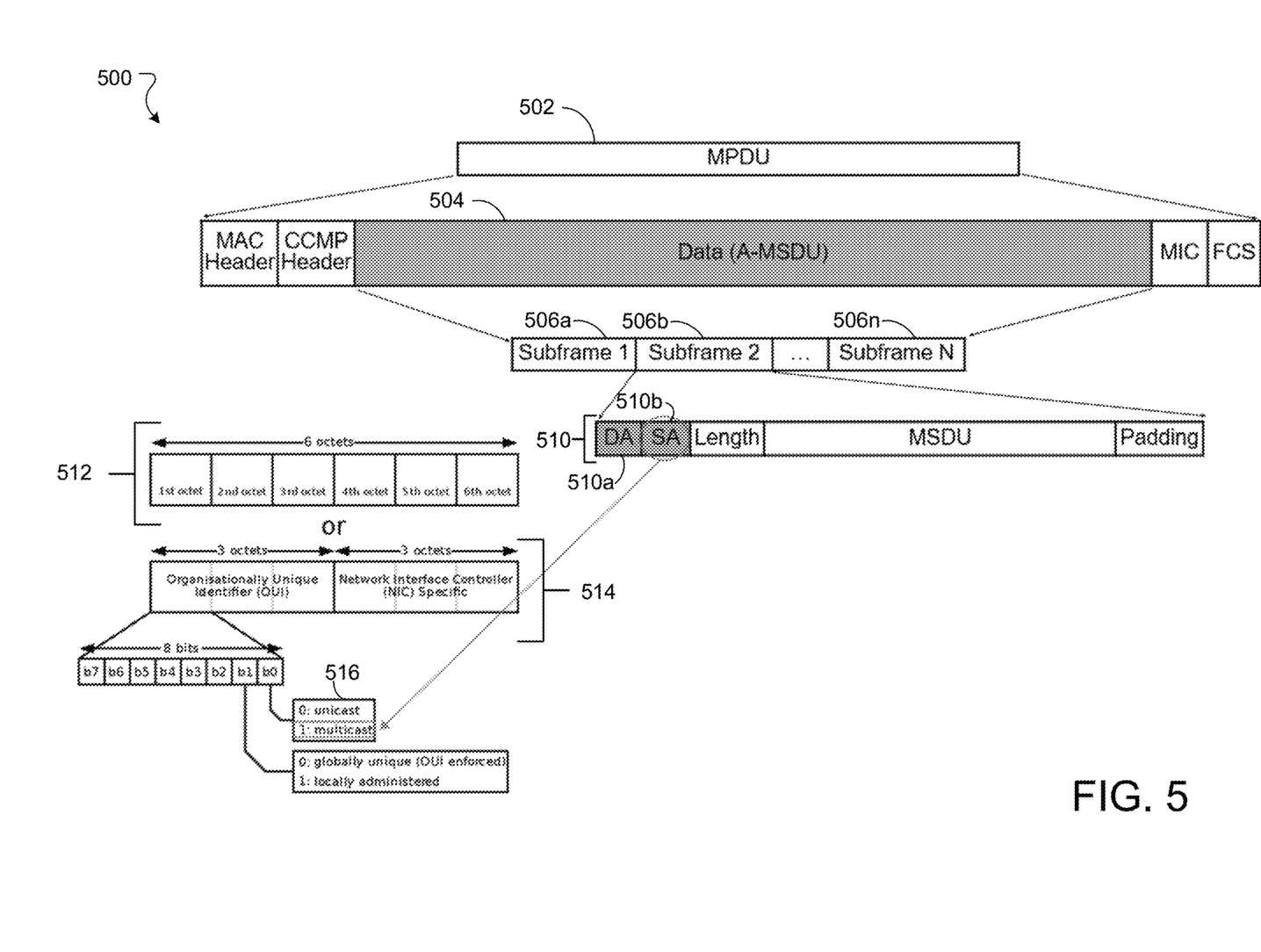
FIG. 5 shows an illustration of a communication packet header.

FIG. 5 shows an example packet 500 for providing privacy protection for MLD devices. There are several additional methods that can be used for protecting private (e.g., sensitive) data previously described, including correlations between premium client devices and network APs, the existence of premium APs to client devices that are not authorized to use them, and so forth. These approaches are configured to protect privacy information. In an example, a client device may encrypt its ML MAC address when it exchanges unprotected authentication and association frames with any AP in a big Wi-Fi network. The Wi-Fi network can use the client device's ML MAC address to provide seamless service to the client, even if the client device roams among different APs in the Wi-Fi network. At the same time, the client device can dynamically change its per-link OTA MAC addresses to prevent being tracked by other devices which are not able to obtain its ML MAC address.

The networking device 105 and a client device are configured to use a session key to protect the ML MAC addresses. This enables the networking device 105 and a client devices to hide their ML MAC addresses. In this example, only authorized client devices and APs have access to the key values. In another example, a client device can dynamically change the MLD OTA (e.g., per-link) address. This can fool attackers into thinking different clients connect to the Wi-Fi network. While the client device changes the MLD OTA MAC address, it should restart the sequence numbers of subsequent frames from a random value. The client device should also hide the MAC address update indication. For example, the new MAC address is hidden in an encrypted field, or a special address format is used that is resolvable. For example, a first portion of the MAC address can include a random number, and a second portion can include a value derived by a hash of the random number and a privacy session key. The receiver of the resolvable address can use the random number and the privacy session key to derive the second portion of the address and determine the appropriate address value. In another example, a client device is configured to dynamically change a per-MLD short format identifier (AID). The AID can be dynamically changed in a similar process as described in relation to the dynamic OTA address process described above. The AID is changed once association is established with an AP. These processes are subsequently described in further detail.

The MLD can be configured to encrypt the ML-MAC address during authentication, association, and during other unprotected frames. For example, when a client device gains access to an AP MLD or an extended service set (ESS) for the first time, the client device obtains an identifier privacy public key (IPPK) from an AP MLD (or ESS). In this example, when the client device associates to the AP MLD or that ESS again, the client device generates a privacy session key based on the AP's identifier privacy public key and its own identifier privacy private key. The client device then uses the privacy session key to encrypt the client device ML-MAC address in all unprotected frames transmitted to the AP MLD. The client device sends its identifier privacy public key to the AP MLD. The AP MLD can then generate the same privacy session key based on the client's privacy public key and its own identifier privacy private key. Continuing this example, the AP MLD can use the privacy session key to decrypt the client's ML-MAC address, and also use the same privacy session key to encrypt its own ML-MAC in all unprotected frames transmitted to the client.

The client device can be configured to dynamically change per-link OTA-MAC addresses for connection to the MLD APs. In this example, after the client device associates to an AP MLD (or ESS), the AP MLD and ESS use the client device's ML-MAC address to identify the client device for roaming and other services. The client device dynamically changes the client device per-link OTA-MAC addresses without causing communication or service interruption because the AP MLD (or ESS) can provide seamless services to the client device based on its ML-MAC address. In this example, when the client device changes one of client device OTA-MAC addresses, the client device shall also restart the sequence numbers of subsequent frames from a random value.

The client device can hide the client device OTA-MAC address update indication by the following methods. First, the client device can include the address update indication and the new address in some protected management frames serving for other purposes, such as the MLD capability/operation query frame. Second, the client device can include the address update indication and the new address in the encrypted fields of data frames. For example, the client device can include the address update information in an A-MSDU subframe header field with the unicast/multicast bit in the source address field set to "1" (means multicast).

FIG. 5 shows a packet 500 including a MPDU data packet 502. The packet 500 is used to include the OTA MAC address update indication and the new address in the encrypted fields of data frames. The A-MSDU packet 504 includes subframes 506*a*-506*n*. In a given subframe (e.g., subframe 506*b*), one of header fields 510 can be used to signal the address change. For example, the source address field 510*b* includes 6 octets 512 or two 3 octet sets 514. One of the octets can include a bit 516 indicating unicast or multicast functionality. Normally, the source address (SA) should always be a unicast address; therefore, the bit 516 is set to 0 (means unicast). To repurpose the header fields 510, the bit 516 can be set to 1 (means multicast) instead. Therefore, when a receiver receives an A-MSDU subframe header with bit 516 set to 1, it knows the header field 510 is repurposed. In some implementations, a bit in the destination address (DA) header 510*a* is provided for this purpose.

In packet 500, one or multiple encrypted fields of a data frame 504 is thus configured to hide sensitive information for the client device in the A-MSDU subframe header field 510. Here, the frame MIC is the integrity of packet frame, and the FCS frame is the checksum. For example, the encrypted DA and SA fields 510*a-b* can be repurposed to include the client device's ML MAC address or updated OTA MAC address, etc. where the bit 516 is used as a signifier (or some similar configuration). The fields 510*a-b* can be extraneous in many applications. For example, it can be used to encrypt other sensitive information originally carried in the unprotected MAC header field of the MPDU, such as the client device's buffer status, operation parameter updates, and the MPDU's traffic category (e.g. TID) etc. The fields 510*a-b* can also be used to encrypt sensitive information in data frames transmitted from an AP to a client device, for example, an updated AID assignment, an operation instruction, and premium service update (e.g. premium AP update) from AP to a client device.

Third, the client device can be configured to use a BLE resolvable private address (RPA) format. The MLD receiver can resolve the address by calculating part of the address using an identity key, such as a random number, and the other part of the address. Generally, BLE devices use a 48-bit address in the advertisement packets. If this address can be decoded by another device, it can track the movement of the advertising BLE device.

The networking device 105 can configured the MLD to dynamically change the per-MLD AID. When a client device MLD associates to an AP MLD, the AP MLD assigns a single AID to the client MLD. All STAs of the client MLD share the same AID. In this example, the client MLD may ask the AP MLD to change the AP AID after security association. In this example, the client MLD may ask the AP MLD to change the AP AID when the client device switches from one link to a different link. In this example, the client MLD may ask the AP MLD to change the AP AID, when the client device changes one of the client device per-link OTA-MAC address. In this example, the client MLD may ask the AP MLD to change the AP AID periodically, in order to hide the correlation between the AP AID and per-link OTA addresses. In some implementations, the client MLD may hide its AID update indication in a similar way as the OTA-MAC address update indication is hidden (e.g., as shown in FIG. 5).

Figure 6:
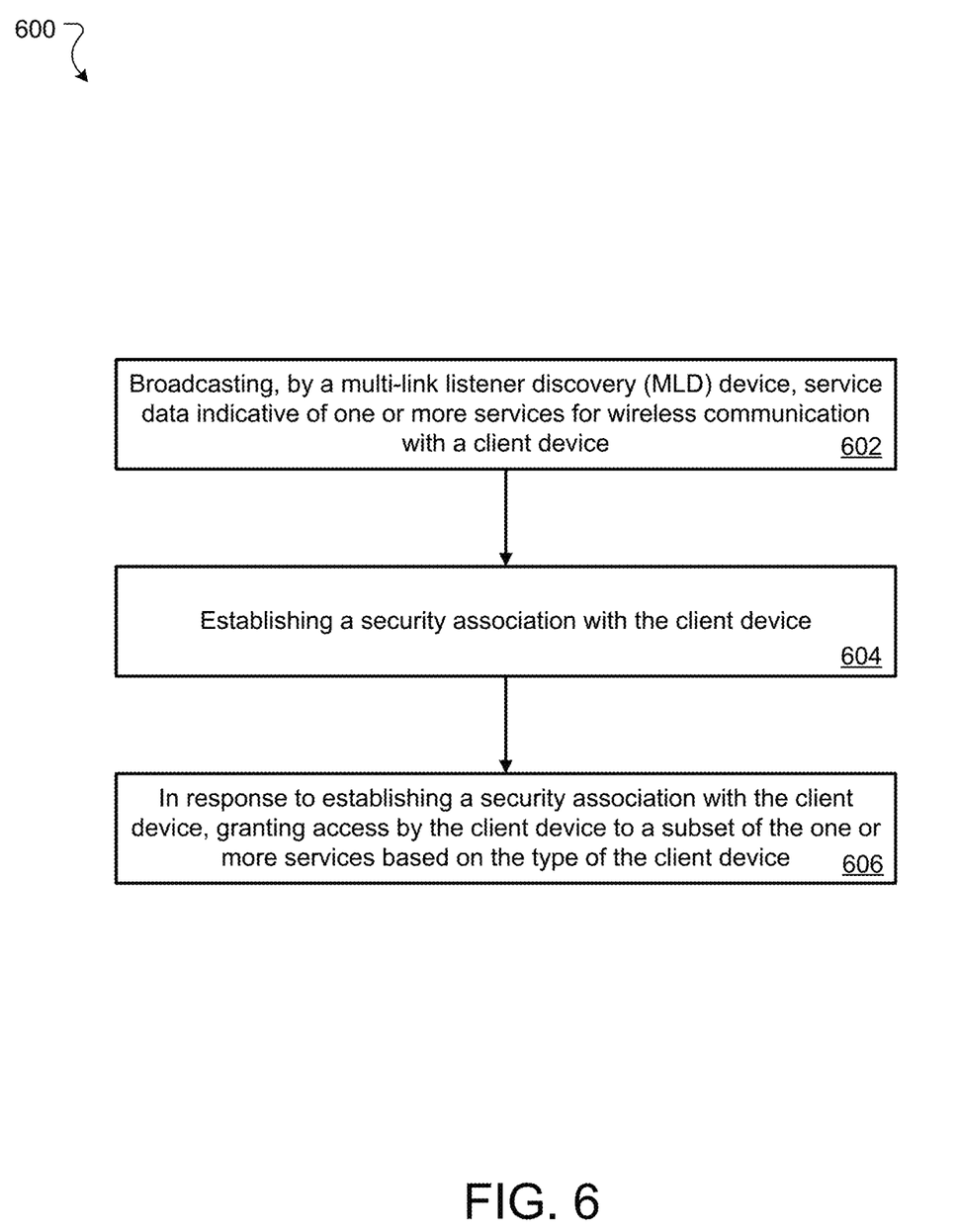
FIG. 6-8 show flow diagrams including an example process for communicating over a wireless network.

FIG. 6 shows a process 600 for privacy protection for MLD devices. The process includes, by a MLD device, broadcasting (602) service data indicative of one or more services for wireless communication with a client device. The service data indicates that a service type is differentiated based on a type of the client device. The MLD device establishes (604) a security association with the client device. The MLD device, in response to establishing a security association with the client device, grants (606) access by the client device to a subset of the one or more services based on the type of the client device.

In some implementations, the type of client device indicates one or more network resources available to the client device. The one or more network resources can include an access point, a subnetwork, or both. In some implementations, one or more services each comprises an access point for establishing a communication link between the client device and a networking device. In some implementations, each access point is associated with a radio band comprising one of a 2.4 GHz radio band, a 5 GHz radio band, or a 6 GHz radio band. In some implementations, the type of client device is indicated by a private pre-shared key (PPSK) or a simultaneous authentication of equals (SAE) password identifier.

In some implementations, the process 600 includes determining, by the MLD device, that the client device is requesting access to a service that the client device is not authorized to access; and in response to determining, rejecting the request and providing an authorized service to the client device instead of the requested service.

Figure 7:
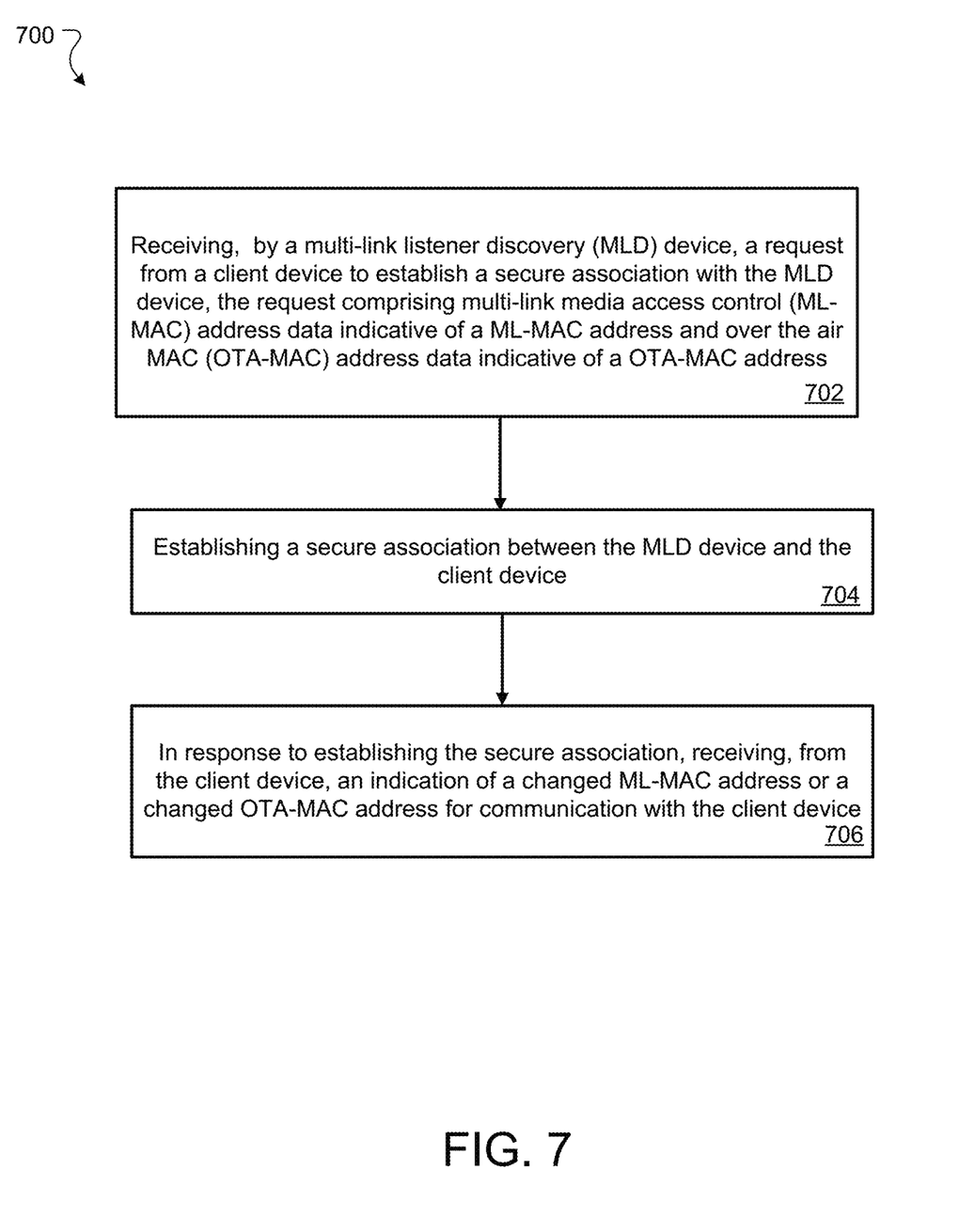

FIG. 7 shows a process 700 for privacy protection for MLD devices. The process 700 includes, receiving (702), by a Multi-Link Device (MLD) device, a request from a client device to establish a secure association with the MLD device. The request includes multi-link media access control (ML-MAC) address data indicative of a ML-MAC address and over the air MAC (OTA-MAC) address data indicative of an OTA-MAC address. The process 700 includes establishing (704) a secure association between the MLD device and the client device. The process 700 includes, in response to establishing the secure association, receiving (706), from the client device, an indication of a changed ML-MAC address or a changed OTA-MAC address for communication with the client device.

In some implementations, the process 700 includes receiving, from the client device, encrypted data indicative of one or more station (STA) OTA addresses. The process can include, in response to establishing the secure association, receiving, from the client device, an indication of a changed STA-OTA for communication with the client device.

In some implementations, the indication of the changed ML-MAC address or the changed OTA-MAC address for communication with the client device is a portion of an encrypted management frame or an encrypted action frame of a communication packet. In some implementations, the MLD comprises a plurality of access points, at least one access point of the plurality being a premium access point and at least one access point of the plurality being a non-premium access point. The process 700 can further include establishing the secure association between the MLD device and the client device using the non-premium access point. The process 700 can include updating the secure association to be between the MLD device and the client device using the premium access point based on the changed ML-MAC address or the changed OTA-MAC address.

Figure 8:
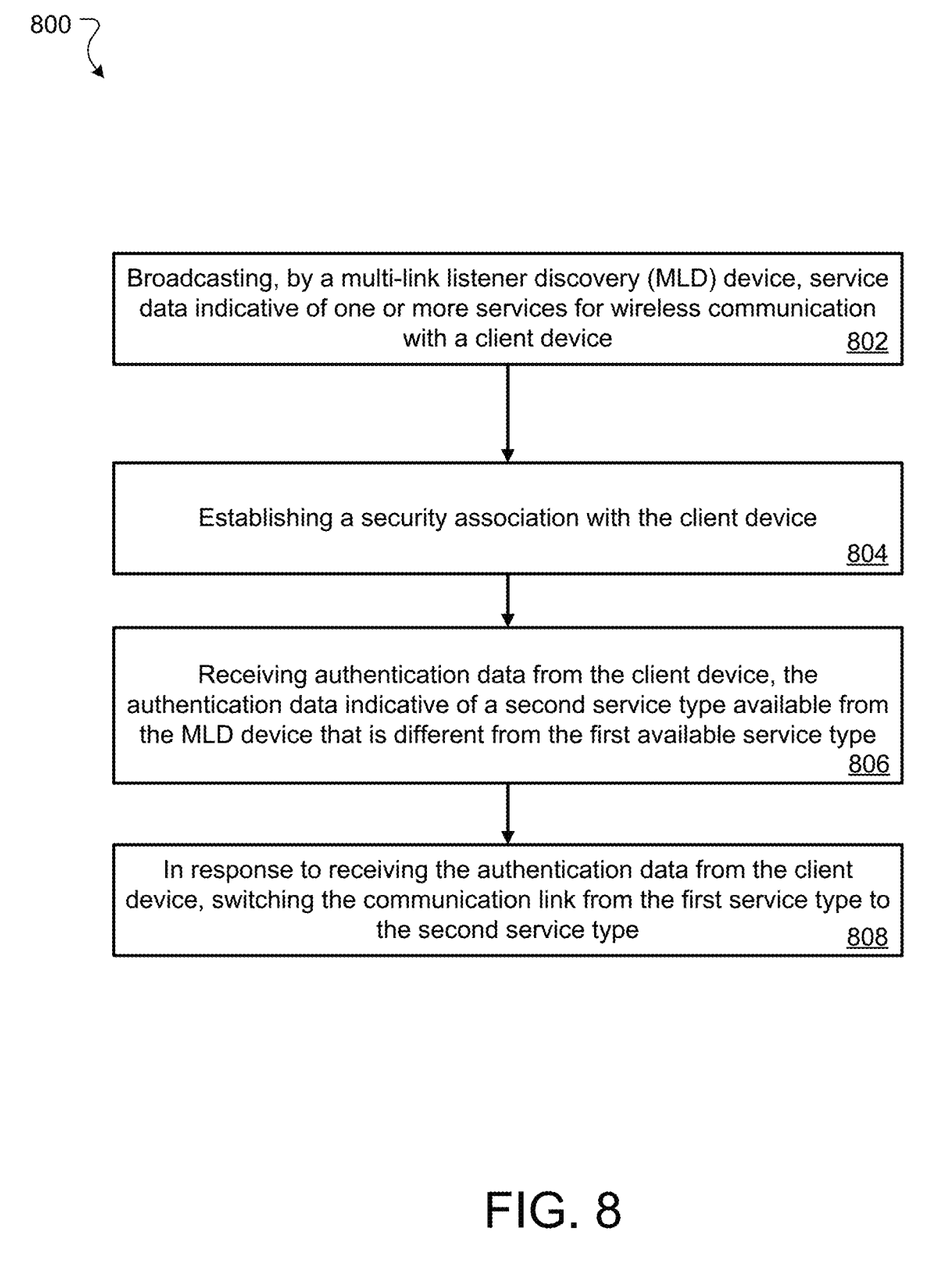

FIG. 8 shows a process 800 for privacy protection for MLD devices. The process 800 can include broadcasting (802), by a Multi-Link Device (MLD) device, service data indicative of one or more services for wireless communication with a client device. The service data indicates a first available service type for a communication link with the MLD device. The process 800 includes establishing (804) a security association with the client device. The process 800 includes receiving (806) authentication data from the client device, the authentication data indicative of a second service type available from the MLD device that is different from the first available service type. The process 800 includes, in response to receiving the authentication data from the client device, switching (808) the communication link from the first service type to the second service type.

In some implementations, the second service type includes a higher bandwidth than the first service type. In some implementations, the second service type comprises a communication using a 6 gigahertz (GHz) radio band. In some implementations, the second service type represents a subnetwork with additional administrative privileges relative to the first service type.

In some implementations, the process 800 includes receiving, by the MLD device, a request for communication using the second service type by the client device prior to establishing the security association with the client device. The process 800 includes rejecting the request without providing an indication that the second service type is available.

In some implementations, the security association enables a unicast communication between the MLD device and the client device.

In some implementations, the process 800 includes providing, by the MLD device, off-link change data to the client device using a secure unicast management data frame.

In some implementations, the process 800 includes broadcasting, by the MLD device, general MLD update data indicating a potential change to a basic service set identifier (BSSID) metric on any established communication link with the MLD device.

In some implementations, the process 800 includes providing an identifier privacy public key to the client device in response to establishing the secure association. The process 800 includes causing the client device to encrypt the ML-MAC address of the MLD device with the identifier privacy public key. The process 800 includes causing a subsequent communication link to include a privacy session key based on the identifier privacy public key and a client identifier privacy public key.

In some implementations, the process 800 includes receiving, from the client device, an update to a per-link over the air MAC (OTA-MAC) address of the client device in an encrypted field of a data frame. In some implementations, the data frame comprises an A-MSDU subframe header, wherein a unicast bit in a source field of the A-MSDU subframe header is set to a predetermined value.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the networking device 105, client devices 108, 110, and the MLD 106 (or portions thereof) can be implemented using digital electronic circuitry, or in computer software, firmware, or hardware, or in combinations of one or more of them. In another example, the process 600, can be implemented using digital electronic circuitry, or in computer software, firmware, or hardware, or in combinations of one or more of them.

Some implementations described in this specification (e.g., networking device 105 client devices 108, 110, MLDs 104, 106, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, networking device 105 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
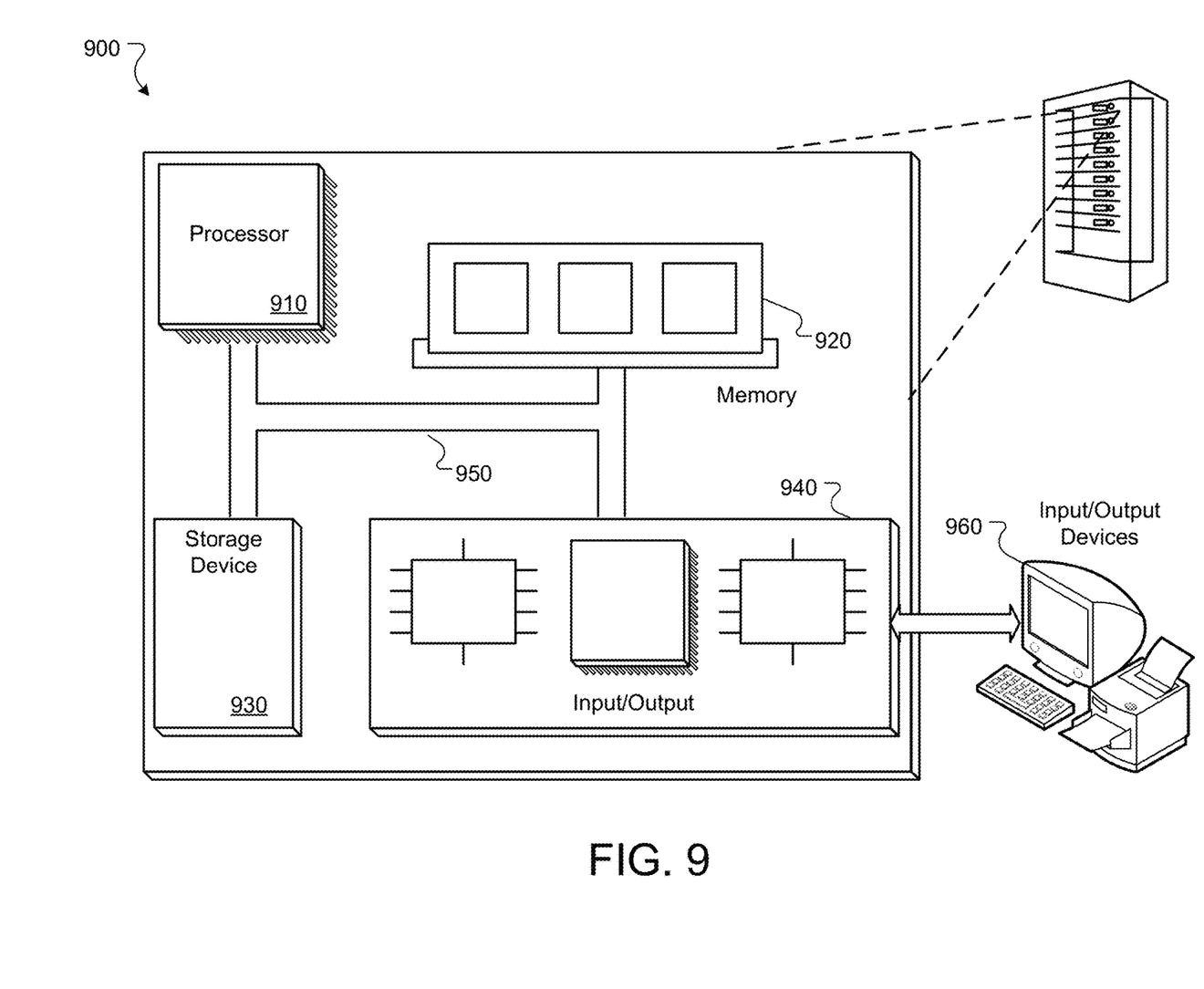
FIG. 9 is a diagram of an example computing system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. An apparatus of a Multi-Link Device (MLD) the apparatus comprising processing circuitry configured to perform operations for communicating over a wireless network, the operations comprising:
broadcasting, by a Multi-Link Device (MLD) device, service data indicative of one or more services for wireless communication with a client device;
wherein the service data indicates that a service type is differentiated based on a type of the client device;
establishing a security association with the client device, the security association enabling a secure communications link; and
in response to establishing a security association with the client device, granting access to the client device by the secure communications link to a subset of the one or more services based on the type of the client device, wherein the subset of the one or more services is hidden from the client device prior to establishing the security association and the secure communications link,
wherein the type of the client device is indicated by a private pre-shared key (PPSK) or a simultaneous authentication of equals (SAE) password identifier.

2. The apparatus of claim 1, wherein the type of the client device indicates one or more network resources available to the client device, the one or more network resources comprising an access point, a subnetwork, or both.

3. The apparatus of claim 1, wherein the one or more services each comprises an access point for establishing a communication link between the client device and a networking device.

4. The apparatus of claim 3, wherein each access point is associated with a radio band comprising one of a 2.4 GHz radio band, a 5 GHz radio band, or a 6 GHz radio band.

5. The apparatus of claim 1, further comprising:
determining that the client device is requesting access to a service that the client device is not authorized to access; and
in response to determining, rejecting the request and providing an authorized service to the client device instead of the requested service.

6. A method for communicating over a wireless network, the method comprising:
receiving, by a Multi-Link Device (MLD) device, a request from a client device to establish a secure association with the MLD device, the request comprising multi-link media access control (ML-MAC) address data indicative of a ML-MAC address and over-the-air MAC (OTA-MAC) address data indicative of a OTA-MAC address;
establishing a secure association between the MLD device and the client device, the security association enabling a secure communications link between the MLD device and the client device; and
in response to establishing the secure association, receiving, from the client device by the secure communications link, an indication of a changed ML-MAC address or a changed OTA-MAC address for communication with the client device, the changed ML-MAC address or the changed OTA-MAC address being associated with at least one service of the MLD device that is hidden from the client device prior to establishing the secure association and the secure communications link,
wherein the MLD comprises a plurality of access points, at least one access point of the plurality being a premium access point and at least one access point of the plurality being a non-premium access point, the method further comprising:
establishing the secure association between the MLD device and the client device using the non-premium access point; and
updating the secure association to be between the MLD device and the client device using the premium access point based on the changed ML-MAC address or the changed OTA-MAC address.

7. The method of claim 6, further comprising:
receiving, from the client device, encrypted data indicative of one or more station (STA) OTA addresses; and
in response to establishing the secure association, receiving, from the client device, an indication of a changed STA-OTA for communication with the client device.

8. The method of claim 6, wherein the indication of the changed ML-MAC address or the changed OTA-MAC address for communication with the client device is a portion of an encrypted management frame or an encrypted action frame of a communication packet.

9. A method for communicating over a wireless network, the method comprising:
- broadcasting, by a Multi-Link Device (MLD) device, service data indicative of one or more services for wireless communication with a client device;
- wherein the service data indicates a first available service type for a communication link with the MLD device;
- establishing a security association with the client device, the security association enabling a secure communications link between the MLD device and the client device;
- receiving authentication data from the client device by the secure communications link, the authentication data indicative of a second service type available from the MLD device that is different from the first available service type, the second service type available from the MLD being hidden from the client device prior to establishing the security association and the secure communications link;
- in response to receiving the authentication data from the client device, switching the communication link from the first service type to the second service type;
- providing an identifier privacy public key to the client device in response to establishing the secure association;
- causing the client device to encrypt an ML-MAC address of the MLD device with the identifier privacy public key; and
- causing a subsequent communication link to include a privacy session key based on the identifier privacy public key and a client identifier privacy public key.

10. The method of claim 9, wherein the second service type includes a higher bandwidth than the first service type.

11. The method of claim 9, wherein the second service type comprises a communication using a 6 gigahertz (GHz) radio band.

12. The method of claim 9, wherein the second service type represents a subnetwork with additional administrative privileges relative to the first service type.

13. The method of claim 9, further comprising:
- receiving, by the MLD device, a request for communication using the second service type by the client device prior to establishing the security association with the client device; and
- rejecting the request without providing an indication that the second service type is available.

14. The method of claim 9, wherein the security association enables a unicast communication between the MLD device and the client device.

15. The method of claim 9, further comprising:
- providing, by the MLD device, off-link change data to the client device using a secure unicast management data frame.

16. The method of claim 9, further comprising:
- broadcasting, by the MLD device, general MLD update data indicating a potential change to a basic service set identifier (BSSID) metric on any established communication link with the MLD device.

17. The method of claim 9, further comprising:
- receiving, from the client device, an update to a per-link over-the-air MAC (OTA-MAC) address of the client device in an encrypted field of a data frame.

18. The method of claim 17, wherein the data frame comprises an A-MSDU subframe header, wherein a unicast bit in a source field of the A-MSDU subframe header is set to a predetermined value.

* * * * *